No. 666,369. Patented Jan. 22, 1901.
J. WISECUP.
ANIMAL TRAP.
(Application filed May 12, 1900.)
(No Model.)

Witnesses

Inventor
J. Wisecup,
by
Attorneys

UNITED STATES PATENT OFFICE.

JOSEPH WISECUP, OF FAWCETT, OHIO.

ANIMAL-TRAP.

SPECIFICATION forming part of Letters Patent No. 666,369, dated January 22, 1901.

Application filed May 12, 1900. Serial No. 16,488. (No model.)

*To all whom it may concern:*

Be it known that I, JOSEPH WISECUP, a citizen of the United States, residing at Fawcett, in the county of Adams and State of Ohio, have invented a new and useful Animal-Trap, of which the following is a specification.

My invention relates to animal-traps, and more particularly to traps for catching rats and smaller animals; and it has for its object to produce a device of this kind which will be simple, cheap, and effective and which will be automatic in its operation.

With these objects in view my invention consists in the improved construction and novel arrangement of parts of the same, as will be hereinafter more fully set forth and illustrated in the accompanying drawings, in which the same reference-numerals indicate corresponding parts in each of the views in which they occur, and in which—

Figure 1:
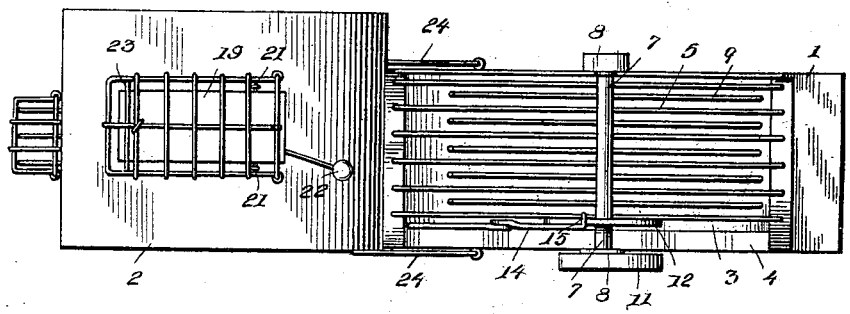
Figure 2:
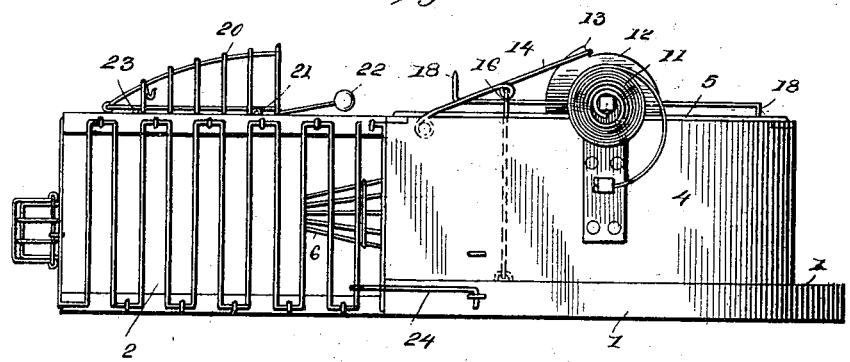
Figure 3:
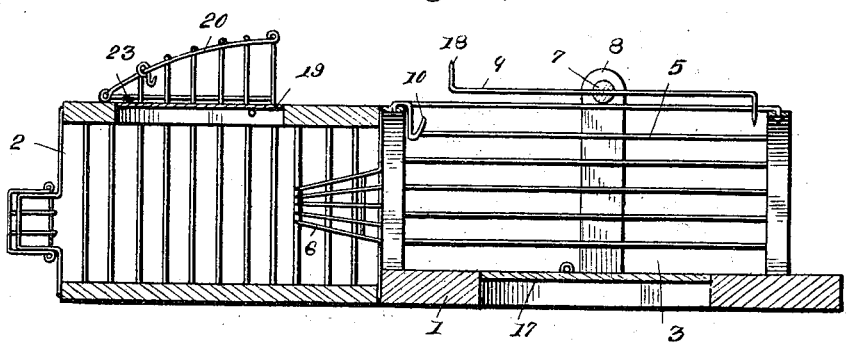

Figure 1 is a top plan view of my improved trap. Fig. 2 is a side view of the same, and Fig. 3 is a longitudinal sectional view.

In constructing my improved animal-trap I provide a suitable base-board 1, at one end of which is provided a suitable receptacle 2, preferably rectangular and detachable therefrom, in front of which is formed the passage-way 3, which extends nearly to the front end of the base. The side walls of the passage-way and of the receptacle are preferably left open, except one wall 4 of the passage-way, as by forming them from metallic rods or wires, the slats 5 of the passage-way being arranged horizontally. The passage-way is open at each end, and the wall of the receptacle adjacent to one end of the passage-way is provided with an inwardly-projecting guard 6, formed from pointed wires in the usual manner, which will permit the animal to pass in, but will prevent its return.

A shaft 7 is journaled in suitable standards 8, about midway of the passage-way, and is provided with oppositely-arranged arms or fingers 9, which are adapted to pass down between the bars or slats of the passage-way as the shaft is revolved. One end of the shaft is provided with means for automatically rotating the shaft when the same is released by the entrance of the animal to get the bait, which is located at a point indicated at 10. One means for rotating the shaft is shown as a spring at 11 upon the solid or non-slotted side of the passage-way, but any other means can be employed—as, for instance, a weight, which I have not thought necessary to show. The shaft is locked against rotation by means of a wheel 12, the periphery of which is provided with two notches or shoulders 13, with which a latch or lock 14 engages to stop the shaft, with the fingers substantially even or parallel with the bars of the passage-way. The latch is pivotally secured at one end to the solid side of the passage-way and has its free end bent laterally, as shown at 15, which will ride upon the periphery of the wheel 12 until it engages with one of the shoulders 13 and stops the further movement of the wheel. The latch is raised from the wheel by means of a rod 16, which is connected at its lower end to a tilting platform 17, which is pivotally secured in the base between the entrance to the passage-way and the bait.

In operating my improved trap it is baited and the spring is wound up to a sufficient tension to rotate the shaft as often as it will probably be needed with one setting. When the animal enters the passage-way to get to the bait, it must necessarily pass over the platform in the base. As soon as it steps upon the front end of the platform its weight will depress it and raise the rear end of the platform correspondingly, carrying with it the rod, which will release the latch from the notched wheel. As soon as this is done the spring will cause the shaft to revolve instantly and carry the fingers down toward the platform and cause them to engage with the animal and forcibly drive it across the platform toward the entrance to the receptacle. I prefer to bend the ends of the fingers, as shown at 18, so as to point in the direction in which the shaft revolves, and to point them so as to enter the flesh of the animal and prevent the fingers from slipping over and letting the animal retrace its steps through the front of the passage-way. When the shaft has made half a revolution and the fingers have been again brought into a longitudinal position or parallel with the upper bars of the passage-way, the latch engages with the succeeding shoulder on the wheel and stops its further rotation. In the meantime the animal has passed through the guard into the receptacle and the trap is again ready for use.

If desired, the top of the receptacle may be provided with a weighted platform 19, over which is arranged a suitable guard or protector 20 and within which the bait is located. The pivotal point 21 of the platform is preferably arranged near the entrance to the guard and the weight 22 extends out beyond the mouth of the guard and normally holds the inner end of the platform up against the stop or cross-piece 23. As thus arranged it will be seen that an animal in trying to get to the bait must necessarily enter the mouth of the guard and step upon the platform. As soon as the animal advances far enough upon the platform to cause its weight to overbalance the weight upon the platform the inner end of the platform will be depressed and the rear end elevated, which will cause the animal to slide down into the receptacle, the platform being preferably formed from metal to prevent the animal from sticking its claws into it and getting out of the trap. After the animals have thus entered the receptacle 2, they can be removed therefrom by releasing the hooks 24, which hold the receptacle and the passage-way together. The outlet-door to the receptacle, which may be formed in any ordinary manner, as by making the bottom removable, is opened and the animals permitted to run out, when they can be disposed of as seen fit. After this the receptacle is again connected with the passage-way and the trap is ready for use. As each animal is driven out of the passage-way beyond the bait the succeeding animals will not be deterred by the presence of the captured animals from trying to get to the bait, thereby rendering it possible to capture several animals with one setting of the trap, as two animals are captured with each revolution of the shaft.

Although I have shown what I consider to be the most desirable form of embodying my invention, yet I reserve to myself the right to make such changes and alterations therein as will come within the scope of my invention.

Having thus fully described my invention, what I claim as new, and desire to secure by Letters Patent, is—

In an animal-trap, the combination, with a base provided with an open-ended passage-way thereon, the top of said passage-way being formed with longitudinally-arranged bars, of standards at the sides of the passage-way, a shaft journaled in the standards above said passage-way provided with arms arranged in position to pass between said bars and to sweep over the platform, the ends of said arms being bent in the direction of the revolution of the shaft, means for locking the shaft against revolution with its bars parallel with the top of the passage-way, a tilting platform in the base connected with the lock so as to release the shaft when the platform is tilted, means for automatically rotating said shaft, and a receptacle detachably secured to the end of the base, the wall of which adjacent to the passage-way is provided with an inwardly-projecting guard, substantially as described.

JOSEPH WISECUP.

Witnesses:
P. C. FOSTER,
THOMAS HOEYE.